(12) United States Patent
Marlow et al.

(10) Patent No.: US 8,596,941 B2
(45) Date of Patent: Dec. 3, 2013

(54) SCREW LOCK ACCESSORY RETAINING DEVICE

(75) Inventors: John Titus Marlow, West Saint Paul, MN (US); Thomas George Marlow, Portland, ME (US); Wade Randal Malcolm, Saint Michael, MN (US)

(73) Assignee: Concorde International, Plymouth, MN (US)

( * ) Notice: Subject to any disclaimer, the term of this patent is extended or adjusted under 35 U.S.C. 154(b) by 325 days.

(21) Appl. No.: 13/048,752

(22) Filed: Mar. 15, 2011

(65) Prior Publication Data

US 2011/0262242 A1 Oct. 27, 2011

Related U.S. Application Data

(60) Provisional application No. 61/342,902, filed on Apr. 22, 2010.

(51) Int. Cl.
*F16B 13/04* (2006.01)

(52) U.S. Cl.
USPC ............................................. 411/34; 292/257

(58) Field of Classification Search
USPC ............................................. 411/55; 24/453
See application file for complete search history.

(56) References Cited

U.S. PATENT DOCUMENTS

| | | |
|---|---|---|
| 1,065,896 A | 6/1913 | Carter |
| 2,822,103 A * | 2/1958 | Moeller ........................ 215/359 |
| 3,421,726 A | 1/1969 | Getter |
| 3,812,810 A | 5/1974 | Moeller |
| 4,027,892 A | 6/1977 | Parks |
| 4,657,299 A | 4/1987 | Mahan |
| 4,662,594 A | 5/1987 | Dubis |
| 4,694,594 A * | 9/1987 | Thorud et al. .................. 37/244 |
| 4,906,148 A | 3/1990 | Schule |
| 5,011,351 A | 4/1991 | Terry |
| 5,035,265 A * | 7/1991 | Chen ............................... 138/89 |
| 5,044,403 A * | 9/1991 | Chen ............................... 138/89 |
| 5,160,224 A | 11/1992 | Schweibert |
| 5,273,382 A | 12/1993 | Yearick |
| 5,499,595 A | 3/1996 | Pollen |
| 5,915,900 A | 6/1999 | Boltz |
| 6,224,309 B1 * | 5/2001 | Yamamoto ...................... 411/11 |
| 6,419,104 B1 * | 7/2002 | Sarajian ........................ 220/234 |
| 6,453,603 B1 * | 9/2002 | Baker .............................. 43/124 |
| 6,659,513 B1 | 12/2003 | Ramsauer |
| 6,712,571 B2 | 3/2004 | Krohlow et al. |
| 6,883,546 B1 * | 4/2005 | Kobylinski ..................... 138/89 |
| 7,055,454 B1 | 6/2006 | Whiting et al. |
| 7,222,582 B1 | 5/2007 | Whiting et al. |

* cited by examiner

*Primary Examiner* — Gary Estremsky

(57) ABSTRACT

Systems, apparatus and methods for an accessory retaining device are described. According to various embodiments, a handle, shaft and flange are configured to provide a rotational interface. With the assistance of threading between the shaft and the handle or other components, rotation of the handle causes axial movement of the shaft and compression of a grommet located about the shaft or flange. Compression of the grommet results in radial expansion. In this way, the accessory retaining device is adapted to secure an accessory to a mounting aperture located on a vehicle or other device when the handle is in a closed position. Other embodiments are described and claimed.

23 Claims, 11 Drawing Sheets

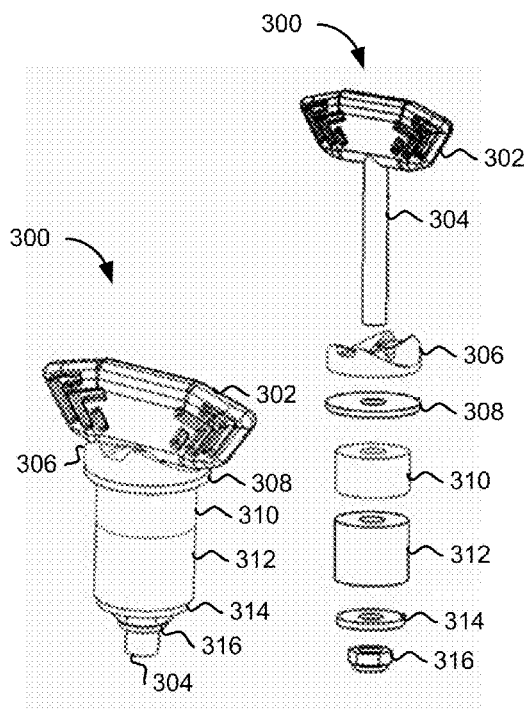 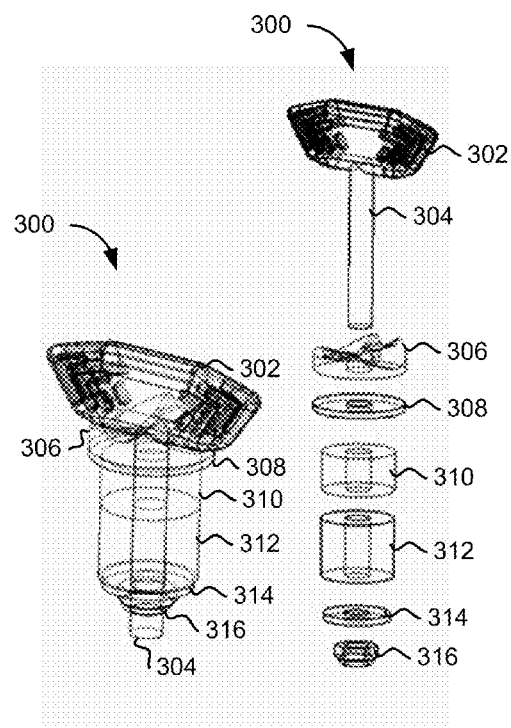
FIG. 3A   FIG. 3B      FIG. 4A   FIG. 4B

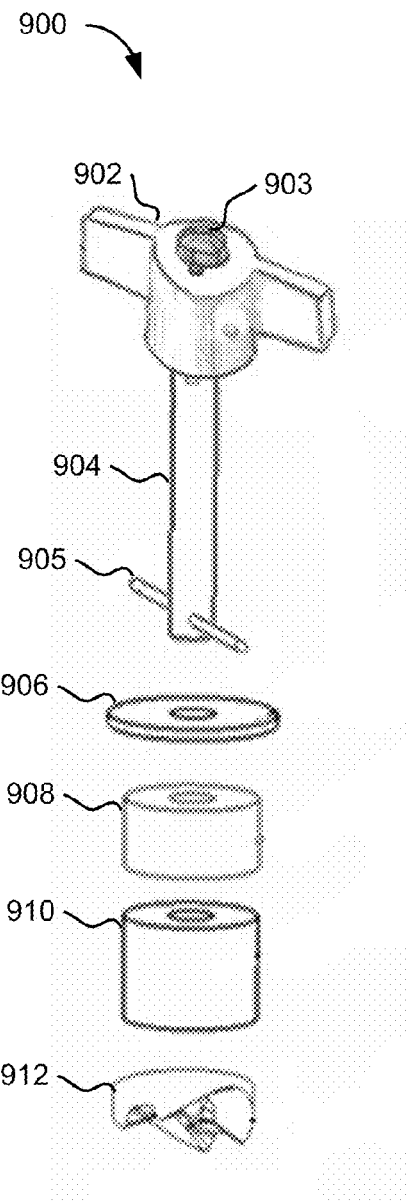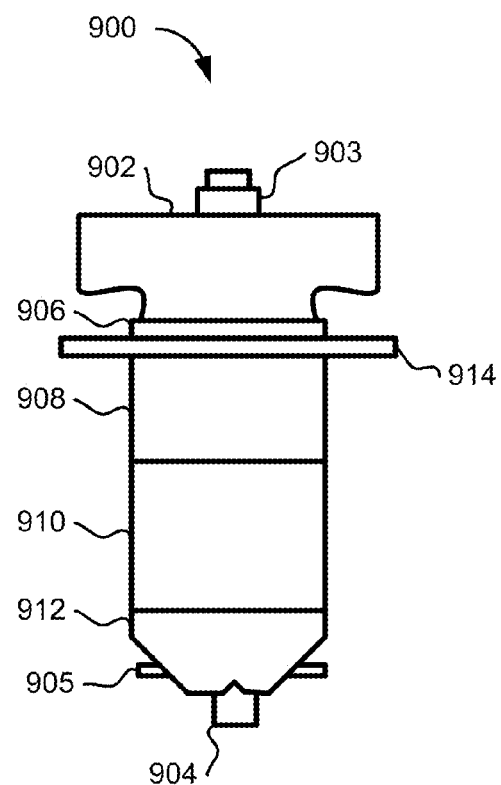
FIG. 9A
FIG. 9B

SCREW LOCK ACCESSORY RETAINING DEVICE

RELATED APPLICATIONS

This application claims priority to U.S. Provisional Application Ser. No. 61/342,902 entitled "Accessory Retaining Device" filed on Apr. 22, 2010. This application is related to U.S. patent application Ser. No. 13/034,422 entitled "Accessory Retaining Device" filed on Feb. 24, 2011.

FIELD

The present inventive subject matter relates to the field of mechanical retaining devices and more particularly to accessory attachment for vehicles and other devices.

BACKGROUND

Accessories for automobiles and recreational vehicles typically exist as factory options, dealer options, or aftermarket parts. Accessories may be custom fit for a particular make and model, designed to specifically fit with the contours or existing systems on the vehicle. Other times, parts may be more generic and universal, allowing for use in a number of differing applications. Some accessories require little to no modification of the original vehicle, while others require modifications (i.e. drilling, welding, cutting) to allow for installation of the accessory.

One of the issues with accessories in general lies in the ability to quickly and effectively install and remove the part. Certain accessories have seasonal application (e.g. gun racks during hunting season), others have more use during certain periods of the day (e.g. auxiliary lights), and others are simply more useful for specific projects and not necessary to be attached to the vehicle at all times (e.g. racks, tool holders, cargo carriers, etc. . . . ). Some accessories require standard or specialized tools to install and remove. Some accessories require time and effort to install and remove so as to make such a task prohibitive to undertake on a repetitive basis.

BRIEF DESCRIPTION OF THE DRAWINGS

Embodiments of inventive subject matter may be best understood by referring to the following description and accompanying drawings, which illustrate such embodiments. In the drawings:

FIGS. 3A and 3B are perspective and exploded views of an accessory retaining device according to various embodiments;

FIGS. 4A and 4B are wireframe perspective and exploded of the accessory retaining device of FIGS. 3A and 3B, according to various embodiments;

FIGS. 9A and 9B show an exploded perspective view and an unlocked profile view of an accessory retaining device according to various embodiments;

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
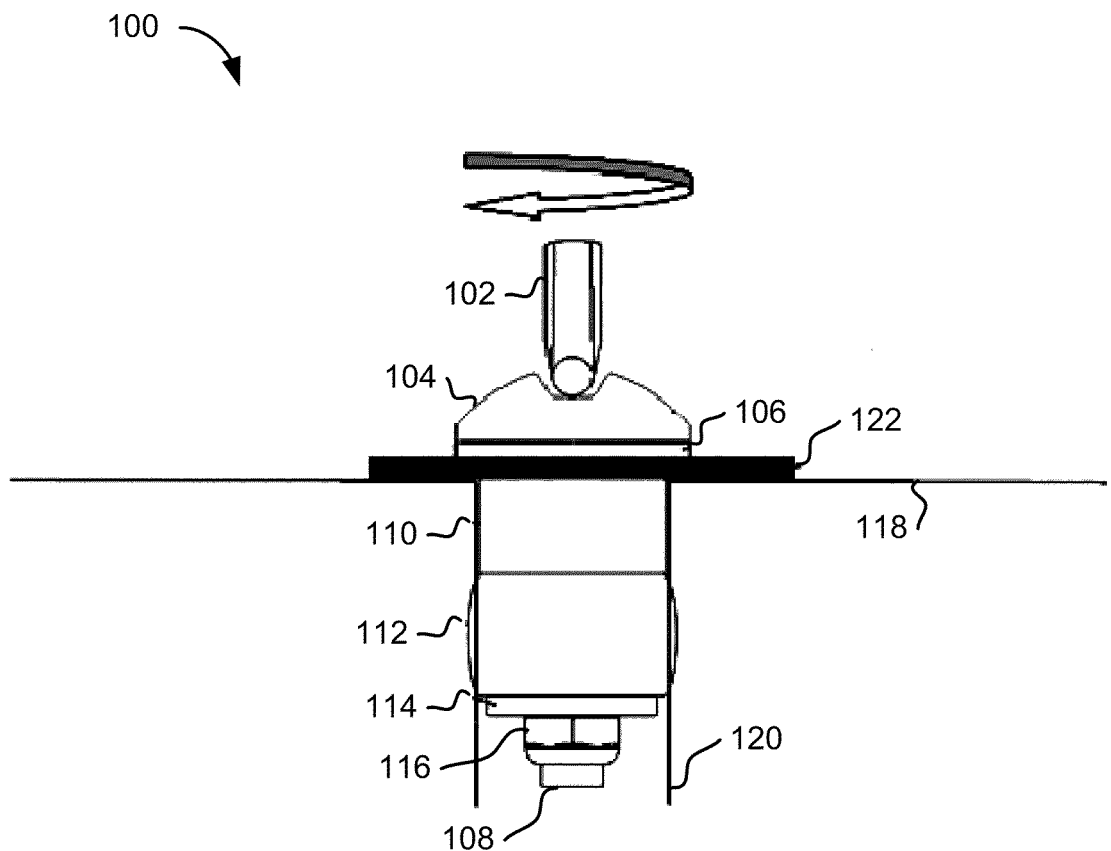
FIG. 1 is a profile view of a seated and locked accessory retaining device according to various embodiments.

FIG. 1 is a profile view of a seated and locked accessory retaining device ("ARD") 100 according to various embodiments. In some embodiments, the ARD 100 includes a handle 102, a cam bushing 104, a retaining washer 106, a shaft 108, a spacer 110, a grommet 112, a lower washer 114, and a fastener 116. The ARD 100 may be mounted in a retaining aperture 120 of an object 118. An accessory 122 is attached to the object 118 via the ARD 100.

In this view, the ARD 100 has been manipulated from an unlocked position to a locked position by rotating the handle 102 and shaft 108 approximately 90 degrees. As the handle 102 and shaft 108 are rotated, the handle 102 slides up a ramp on the cam bushing 104. The cam bushing 104 will not substantially twist during the rotation of the handle 102. The washer 106 may be provided to increase friction between the cam bushing 104 and the accessory 122. In an alternative embodiment, the cam bushing 106 may be designed whit ha bottom surface having an increased coefficient of friction to reduce the propensity to twist with the handle 102.

The handle 102 and shaft 108 may be rotated until the handle 102 reaches a groove or resting point in the cam bushing 106, where it is considered locked. As the handle 102 is twisted and rides up a ramp on the cam bushing 106, a translational motion is provided to the handle 102 and shaft 106. The shaft 106 is connected to the handle 102 at its proximal end and to the fastener 116 at or near its distal end. The lower washer 114, the grommet 112, the spacer 110, the accessory 122, the retaining washer 106 and the cam bushing 104 are all arranged on the shaft 108 between the fastener 116 and the handle 102. The translational motion from rotating the handle 102 along the cam bushing 104 creates a compressive force on the components arranged on the shaft 108. The grommet 112 can be designed to be more compressible (greater tendency to compress) than the other components. As such, the compressive force applied to the components arranged on the shaft 108 will serve to compress the grommet 112 in the axial direction, causing it to expand in the radial direction.

The ARD 100 of FIG. 1 is shown in a locked position, and as such the grommet 112 is compressed. For illustrative purposes the grommet 112 appears to be extending beyond the walls of the retaining aperture 120. In practice, the grommet 112 would be radially compressed against the retaining aperture 120. The radial compression against the retaining aperture 120 provides sufficient friction between the grommet 112 and the retaining aperture 120 to maintain the ARD 100 in a substantially fixed position. By locking the ARD 100 into a substantially fixed position with respect to the retaining aperture 120, the ARD is able to hold the accessory 122 to the object 118.

Figure 2:
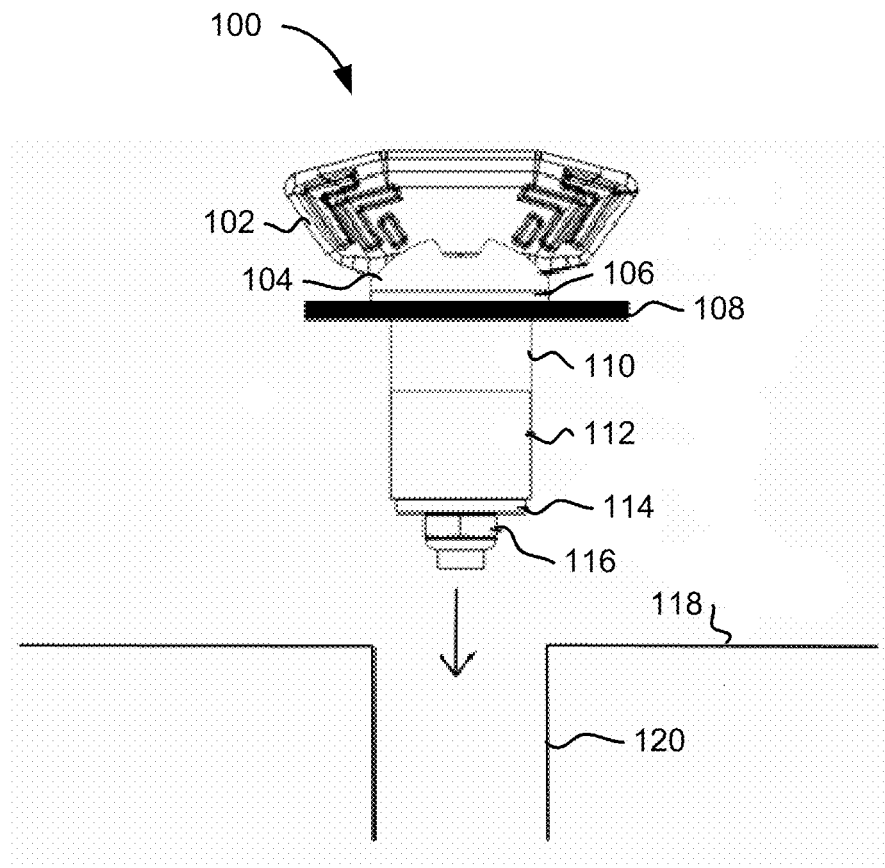
FIG. 2 is a profile view of the accessory retaining device of FIG. 1 in an unlocked configuration according to various embodiments.

FIG. 2 is a profile view of the ARD 100 of FIG. 1 in an unlocked configuration according to various embodiments. In an unlocked configuration, the handle 102 is resting on the cam bushing 104 at a low point, and the grommet 112 is substantially uncompressed. In this state, the ARD 100 may be inserted into the retaining aperture 120 of the object 118. Were the ARD 100 in locked configuration (see FIG. 1), the ARD 100 would not be able to be inserted into the retaining aperture 120 because the grommet 112 would be compressed and the radius of the grommet 112 would be greater than the radius of the retaining aperture 120.

FIGS. 3A and 3B are perspective and exploded views of an ARD 300 according to various embodiments. The handle 302 may be integrally connected to the shaft 304. According to various embodiments, the handle 302 may be cast with the shaft 304 as a single piece. According to other embodiments, the handle 302 may be connected to the shaft 204 by welding, crimping, adhesive or other fastening method. According to some other embodiments, the integral connection between the handle 302 and the shaft 304 need not be permanent; the handle 302 may be removable with respect to the shaft 304, so long as the connection method allows for the shaft 304 to rotate with the handle 302 when connected.

A cam bushing 306 has a central aperture to allow it to be placed along the shaft 304 near the handle 302. A retaining washer 308 may be placed along the shaft below the cam bushing 306 in order to provide additional friction as needed. In some embodiments, the retaining washer 308 may be integral or integrally connected to the cam bushing 306. A spacer 310 having a central aperture may be placed along the shaft 304 below the retaining washer 308 and/or cam busing 306. An accessory device or mounting bracket to be retained by the ARD 300 may be placed along the shaft between the retaining washer 308 (or cam busing 306 if no retaining washer is used) and the spacer 310. The spacer 310 may be made of a substantially rigid material. The purpose of the spacer, generally, is to allow a compressible grommet 312 to be positioned further down on the shaft 304. In some embodiments, the spacer 310 is not used. In some other embodiments, the spacer may be integral or integrally connected to the compressible grommet 312. The compressible grommet 312 having a central aperture may be placed along the shaft below the spacer 310 (where used). The compressible grommet 312 may be made of a substantially compressible material, including but not limited to rubber, foam, cork, or other materials. In many embodiments, the compressible grommet 312 will compress easier than the other components of the ARD 300.

A fastening system 314, 316 may be attached to the end of the shaft 304 in order to hold the compressible grommet 312, spacer 310, retaining washer 308, cam busing 306 (and an accessory mount) on the shaft 304 between the fastening system 314, 316 and the handle 302. In some embodiments, the fastening system 314, 316 may include a washer 314 and a nut 316. The nut 316 may be a lock-nut in some embodiments. In some other embodiments, the nut 316 may be a crown nut, and locked in place with a cotter pin. In some embodiments, the nut 316 and the washer 314 may be integrally connected. According to many embodiments, the fastening system 314, 316 is removable from the shaft 304, in order to allow a mounting bracket for an accessory to be placed on the shaft 304. In other embodiments, the fastening system 314, 316 may be substantially permanently attached (i.e. welded, crimped, etc. . . . ) to the shaft 304, and the mounting bracket for the accessory may be placed along the shaft from the handle 302 end of the shaft 304. In yet other embodiments, the mounting bracket for the accessory may have an open edge (similar to a bifurcation) allowing it to be places at least partially about the shaft 304, and allowing the handle 302 and the fastening system 314, 316 to be substantially permanently mounted to the shaft 304.

FIGS. 4A and 4B are wireframe perspective and exploded of the ARD 300 of FIGS. 3A and 3B, according to various embodiments. FIGS. 4A and 4B are provided to show a somewhat "transparent" view of the components of the ARD 300, specifically the apertures of the cam bushing 306, retaining washer 308, spacer 310, compressible grommet 312, and fastening system 314, 316.

Figure 5:
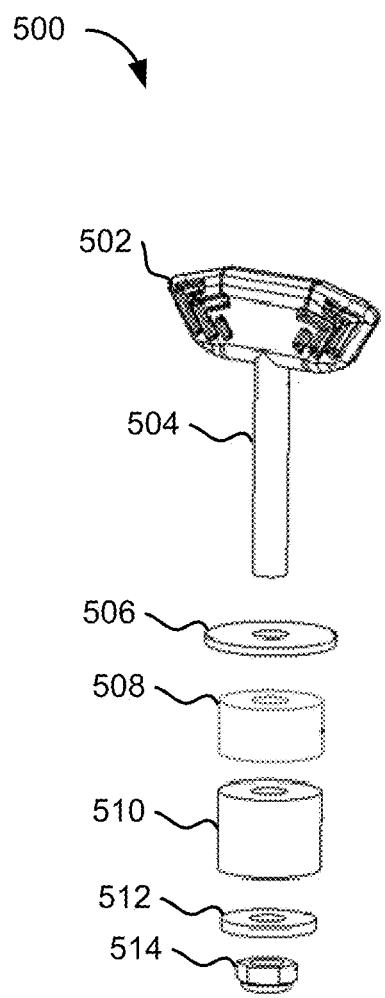
FIG. 5 is an exploded perspective view of an accessory retaining device according to various embodiments.

FIG. 5 is an exploded perspective view of an ARD 500 according to various embodiments. The ARD 500 includes a handle 502, a shaft 504, an upper washer 506, a spacer 508, a grommet 510, and a fastener 512, 514. The fastener may include a lower washer 512 and a nut 514.

The ARD 500 works by creating a compressive force between the fastener 512, 514 and the handle 502. The shaft 504 is connected to the handle 502 on a proximal end and may be threaded on a distal end. The connection between the shaft 504 and the handle 502 is such that rotation of the handle 502 results in rotation of the shaft 504. The threaded distal end of the shaft 504 can be engaged with the fastener 512, 514. In various embodiments, the fastener 512, 514 may comprise a lower washer 512 and a nut 514. The washer 512 may be integrally connected to the nut 514. With the threaded distal end of the shaft 504 engaged with the nut 514, rotation of the shaft will cause the nut 514 to move either away from or towards the handle 502.

Between the handle 502 and the nut 514 are the upper washer 506, the spacer 508, the grommet 510 and the lower washer 512. When the shaft 504 is rotated, causing translational movement of the nut 514 along the major axis of the shaft 504 towards the handle 502, a compressive force may be created between the nut 514 and the handle 502. The grommet 510 may be designed to be more compressible than the other parts of the ARD 500. When the handle 502 and shaft 504 are rotated in a direction to cause the nut 514 to become more threaded onto the shaft 504, the grommet 510 will compress and expand in a radial direction substantially perpendicular to the major axis of the shaft 504.

According to various embodiments, the fastener 512, 514 may include friction enhancing features such as roughened surfaces or barbs in order to resist rotating with the shaft 504. Additionally, in some embodiments, the spacer 510, upper washer 506, and/or lower washer 512 may be omitted.

Figure 6:
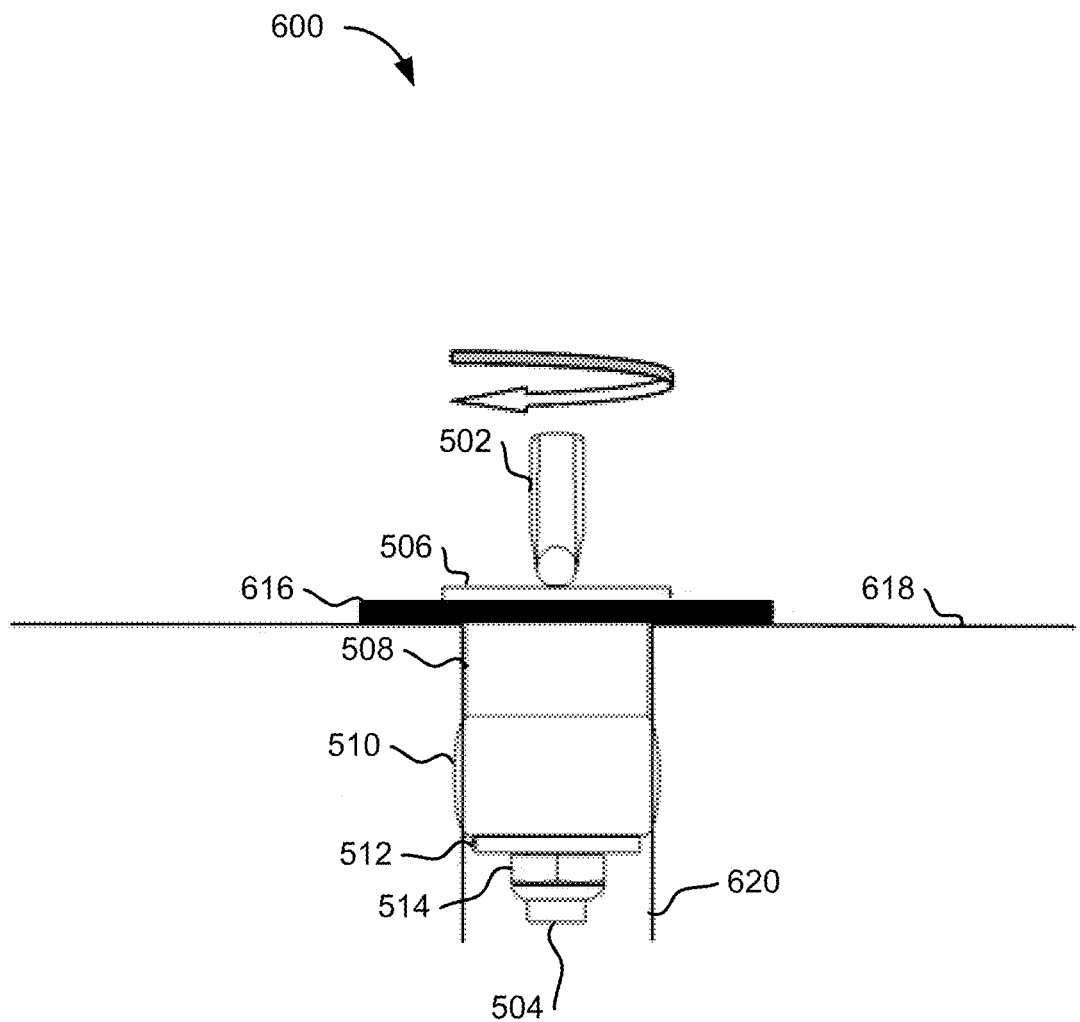
FIG. 6 is a profile view of a seated and locked accessory retaining device according to various embodiments.

FIG. 6 is a profile view of a seated and locked ARD 600 according to various embodiments. FIG. 6 illustrated an ARD 600 attaching an accessory mounting bracket (or simply an accessory) 616 to a device 618 via a retaining aperture 620.

According to some embodiments, the accessory mounting bracket 616 may be placed among the shaft 504 between the handle 502 and the upper washer 506. According to some other embodiments, the accessory mounting bracket 616 may be placed along the shaft 504 between the upper washer 506 and the spacer 508. In yet other embodiments, an additional upper washer 506 may be added and the accessory mounting bracket 616 may be placed along the shaft 504 between the washers. Twisting the handle 502 will serve to compress the grommet 510 within the retaining aperture 620, seating the ARD 600 within retaining aperture 620. For illustrative purposes the grommet 510 appears to be extending beyond the walls of the retaining aperture 620. In practice, the grommet 510 would be radially compressed against the retaining aperture 620. The compressive force on the elements between the handle 502 and the nut 514 not only acts to radially expand the grommet 510, but also to squeeze the accessory mounting bracket 616 in order to help restrict rotation and other movement. The end result of rotating the handle 502 to seat the ARD 600 is that the accessory mounting bracket 616 (and thus the accessory itself) is solidly and soundly mounted to the device 618.

Figures 7A, 7B:
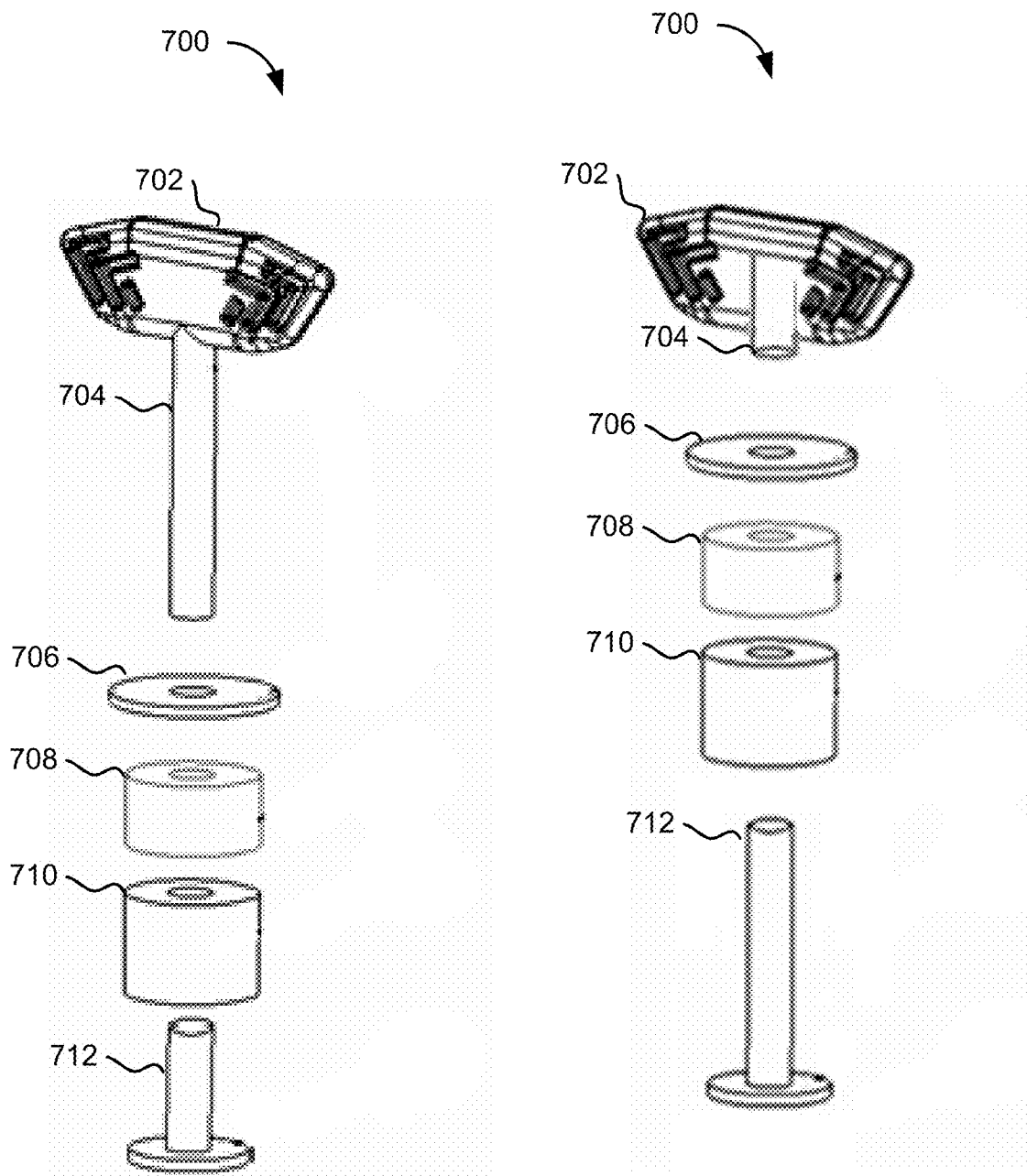
FIGS. 7A and 7B are exploded perspective views of a accessory retaining devices according to various embodiments.

FIG. 7A is an exploded perspective view of ARD 700 according to various embodiments. The ARD 700 includes a handle 702, a shaft 704, a washer 706, a spacer 708, a grommet 710 and a flanged fastener 712.

The ARD 700 is similar to the ARD 600 of FIG. 5, except that the fastener 512, 514 (FIG. 5) is replaced with a flanged fastener 712. The flanged fastener 712 may fit at least partially through the grommet 710 and have a portion able to accept a threaded end of the shaft 704. According to some embodiments, the shaft 704 can have an external thread and the flanged fastener 712 can have an internal thread. Alternatively, the shaft 704 can have an internal thread and the flanged fastener 712 can have an external thread, allowing the two parts to fasten together. As the handle 702 and shaft 704 are rotated the distance between the flanged fastener 712 and the handle 702 may decrease, squeezing the grommet 710, causing the outside diameter of the grommet 710 to increase and grip an aperture wall (as seen in FIG. 6).

FIG. 7B is an exploded perspective view of ARD 700 according to various other embodiments. In this embodiment, the shaft 704 is shortened, while the flanged fastener 712 is elongated. The respective lengths of the shaft 704 and the flanged fastener 712 determine where the two parts will meet along the axis of the ARD 700. As discussed with respect to FIG. 7A, according to some embodiments, the shaft 704 can have an external thread and the flanged fastener 712 can have an internal thread. Alternatively, the shaft 704 can have an internal thread and the flanged fastener 712 can have an external thread, allowing the two parts to fasten together.

According to various embodiments, the shaft 704 may be defined simply by the presence of an internal threaded pathway within the handle 702. The flanged fastener may be of length to extend through the grommet 710, spacer 708 and washer 706 to interface with the shaft 704 as part of the handle 702.

Figure 8:
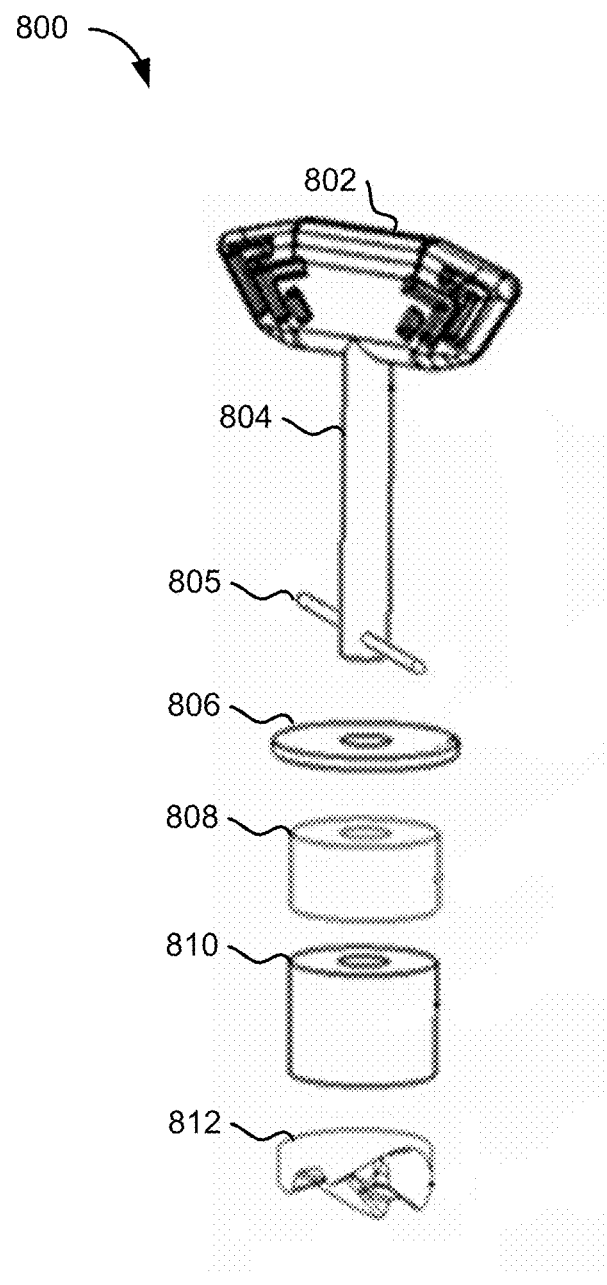
FIG. 8 is an exploded perspective view of an accessory retaining device according to various embodiments.

FIG. 8 is an exploded perspective view of an ARD 800 according to various embodiments. the ARD 800 includes a handle 802, a shaft 804, a bar 805, a washer 806, a spacer 808, a grommet 810 and a cam bushing 812.

In this embodiment, one or both of the handle 802 and the bar 805 may be removable from the shaft 804. When connected, the handle 802, shaft 804 and bar 805 will rotate together. The washer 806 is positioned on the shaft 804 proximate the handle 802. In some embodiments, an accessory mounting bracket may be placed on the shaft 804 above or below the washer 806. The spacer 808 may be positioned on the shaft 804 below the washer 806. The grommet 810, made of a substantially compressible material is positioned on the shaft 804 below the spacer 808. The cam bushing 812 may be positioned on the shaft below the grommet and proximate the bat 805.

Rotation of the handle 802, shaft 804 and bar 805 will cause the bar 805 to ride along the cam bushing, transitioning the ARD 800 between locked and unlocked states. In an unlocked state, the bar 805 rests in a valley on the cam bushing 812, providing the least amount of compression between the cam bushing 812 and the handle 802. In a locked state, the bar 805 rests near a peak on the cam bushing, providing an increased amount of compression between the cam bushing 812 and the handle 802.

FIGS. 9A and 9B show an exploded perspective view and an unlocked profile view of an ARD 900 according to various embodiments. The ARD 900 is similar to the ARD 800 of FIG. 8. The ARD 900 includes a handle 902, a handle retaining mechanism 903, a shaft 904, a bar 905, a washer 906, a spacer 908, a grommet 910, and a cam bushing 912. The handle 902 may be removed from the shaft 904 in order to allow the installation of the cam bushing 912, the grommet 910, the spacer 908 and the washer 906 upon the shaft 904. The shaft 904 may include a channel or protrusion to allow the handle 902 to be installed such that rotation of the handle 902 results in rotation of the shaft 904. Once installed on the shaft 904, the handle retaining mechanism 903 ensures that the handle 902 stays securely on the shaft 904.

An accessory mounting bracket 914 may be added to the ARD 900 along the shaft 904. Rotation of the handle 902 from the unlocked state shown in FIG. 9B will cause a rotation of the shaft 904 and bar 905, resulting in the bar 905 riding along the cam bushing 912 and causing compression in the grommet 910. Compression will also be felt between the washer 906 and the spacer 908, securing the accessory mounting bracket 914.

Figure 10:
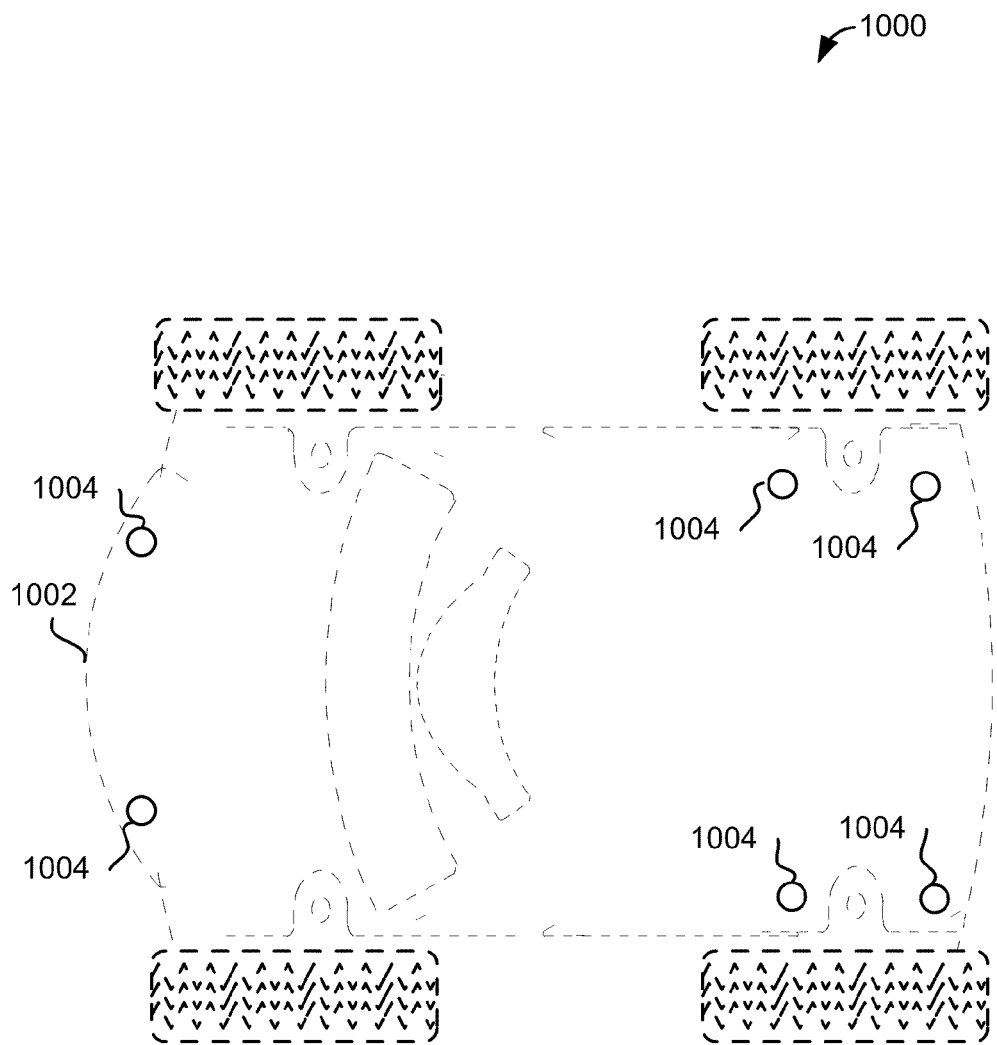
FIG. 10 is a top view of a vehicle with retaining apertures according to various embodiments.

FIG. 10 is a top view of a vehicle 1000 with retaining apertures 1004 according to various embodiments. The vehicle 1000 includes a body 1002 and retaining apertures 1004.

The body 1000 may be made of any number of materials, including but nor limited to fiberglass, plastic, steel, aluminum, and other materials. retaining apertures 1004 may be located on the body 1002 (or in a frame of the vehicle 1000 according to some embodiments). The position of the retaining apertures may generally coincide with locations useful for mounting accessories on the vehicle 1000. According to various embodiments, the vehicle 1000 may be a car, truck, all terrain vehicle, boat, jetski, motorcycle, tractor, aircraft or other vehicle. The inventive subject matter described is not limited by any particular vehicular application.

Figure 11:
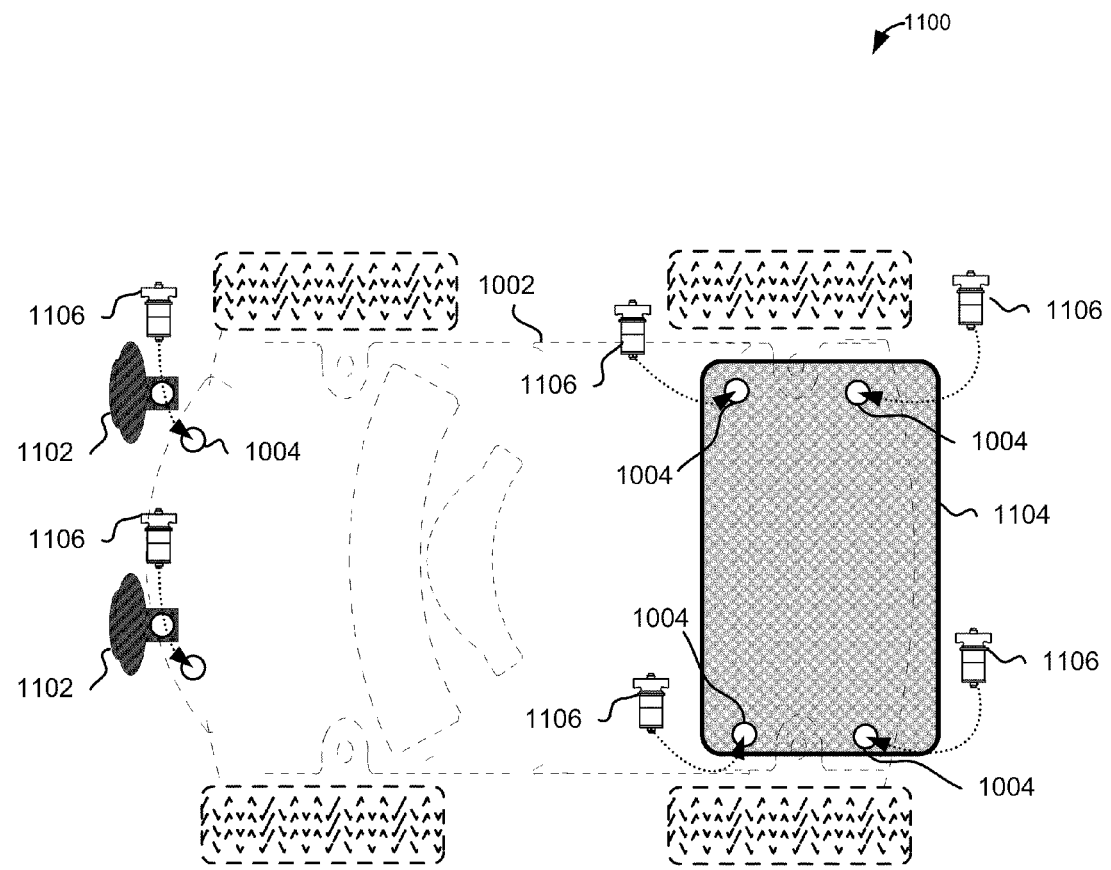
FIG. 11 shows example accessory mounting options on a vehicle, utilizing accessory retaining devices according to various embodiments.

FIG. 11 shows example accessory mounting options on a vehicle 1100, utilizing ARDs 1106 according to various embodiments. The vehicle 1100 includes a body 1002, retaining apertures 1004, single point accessories 1102, multi-point accessories 1104 and ARDs 1106.

According to an example embodiment, the vehicle 1100 may be provided having retaining apertures 1004 in the body 1002. Single point accessories 1102, such as lights, antennas, mirrors, or other accessories may be attached to the body 1002 of the vehicle 1100 at or near the retaining apertures 1004. The single point accessory 1102 may include a mounting bracket. The mounting bracket may be installed on an ARD 1106. Alternatively, the ARD may be interface directly with the single point accessory 1102. The ARD 1106 may then be placed into a retaining aperture 1004 and rotated into a locked position. Once the ARD 1106 is locked, it will hold the single point accessory 1102 in a substantially fixed position with respect to the body 1002 of the vehicle 1100.

According to another example embodiment, the vehicle 1100 may have retaining apertures 1004 in the body 1002 arranged to secure a multi-point accessory 1104. Multi-point accessories 1104 such as racks, light bars, or other accessories needing the support of multiple mounting points may be attached to the body 1002 of the vehicle 1100 at or near a plurality of retaining apertures 1004. The multi-point accessory 1104 may include multiple mounting brackets for interfacing with the ARDs 1106. Alternatively, the ARDs 1106 may interface directly with the multi-point accessory 1104. Each ARD 1106 may be inserted into an appropriate retaining aperture 1004 for the desired positioning and fitment of the multi-point accessory 1104. Once the ARDs 1106 are locked, they will hold the multi-point accessory 1102 in a substantially fixed position with respect to the body 1002 of the vehicle 1100.

Figure 12:
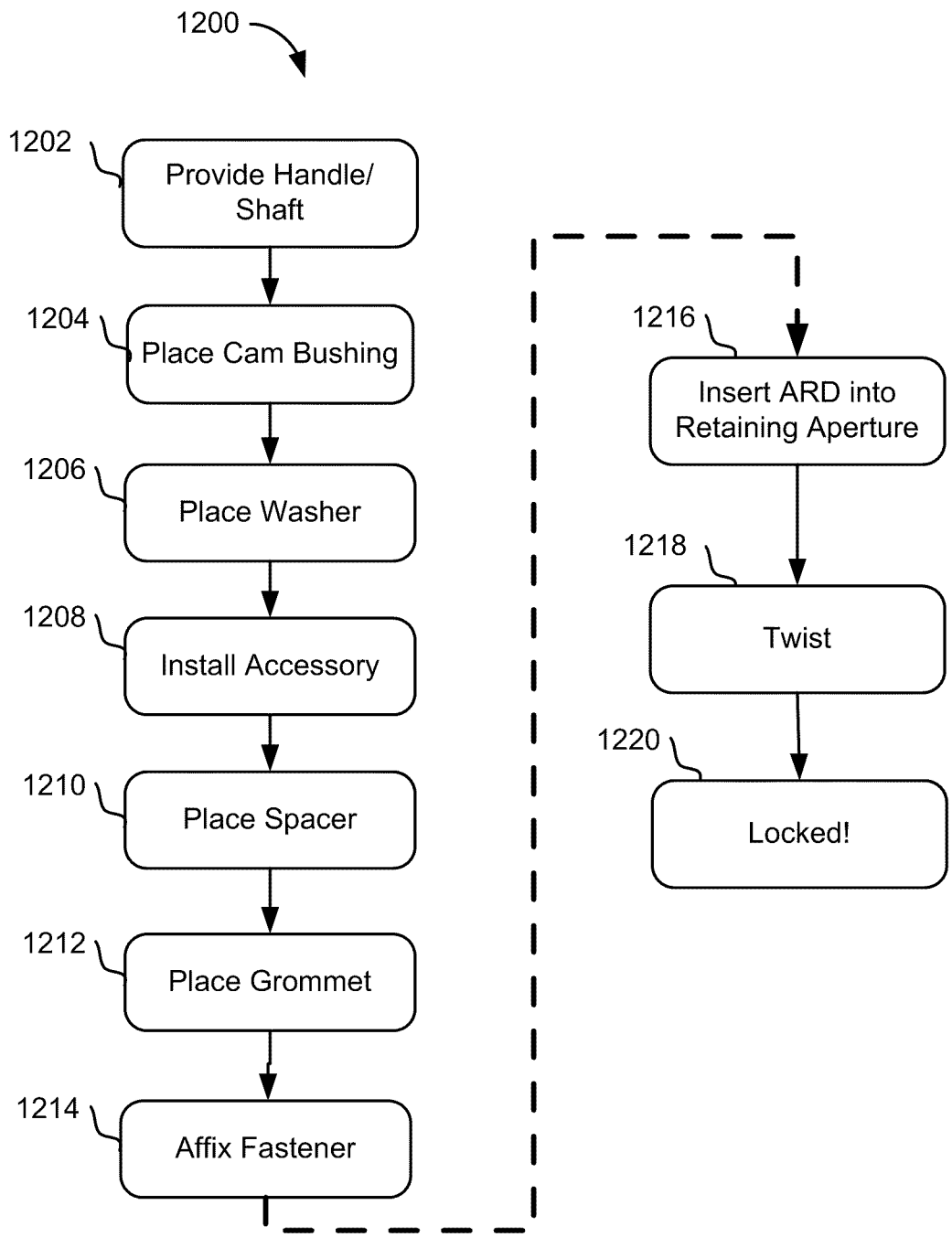
FIG. 12 illustrates a method for assembling and mounting an accessory retaining device.

FIG. 12 illustrates a method 1200 for assembling and mounting an ARD. The method 1200 may begin by providing a handle and shaft in a connected configuration (block 1202). A cam bushing may be placed upon the shaft (block 1204) such that the ramped surface of the cam bushing is facing the handle. Next, a washer may be placed upon the shaft (block 1206) to provide additional friction between the cam bushing and an accessory mount. An accessory or accessory mount may be placed upon the shaft (block 1208) proximate the washer. Alternatively, the accessory may be installed on the shaft at a later time if the mount has a substantially forked or open configuration allowing installation onto the shaft from a radial direction. A spacer may be placed on the shaft proximate the accessory or washer (block 1210). Next, a compressible grommet may be placed upon the shaft (block 1212), and secured by affixing a fastener to the end of the shaft (block 1214). With the fastener affixed, each of the elements (cam bushing, washer, accessory mount, spacer and grommet) should be held between the fastener and the handle on the shaft, with little to no axial compressive force being applied.

The ARD may be placed into a retaining aperture on a device (a vehicle, for example) (block 1216). Once seated in the retaining aperture, the handle/shaft of the ARD may be twisted (block 1218), causing the handle to ride up a ramp of the cam bushing until it reaches a locking point to create a compressive force. The compressive force will cause the compressible grommet to expand radially, locking the ARD into the retaining aperture (block 1220).

The inventive subject matter describes a quick and economical device for attaching an accessory onto and off of a device. A user would not have to access the back side of a device body. The inventive subject matter allows the user to attach an accessory from the exterior while maintaining sufficient fastening strength to hold the accessory securely to the device.

Embodiments of the Accessory Retaining Device are disclosed. One skilled in the art will appreciate that the present teachings can be practiced with embodiments other than those disclosed. The disclosed embodiments are presented for purposes of illustration and not limitation. Various components are presented for the purpose of describing example embodiments. Just because a component is described with respect to an example embodiment does not require that it is a necessary component with respect to the inventive subject matter.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

Additional Example Embodiments

An accessory retaining device comprising: a shaft having a proximal end and a distal end, the distal end being threaded; a handle connected to the proximal end of the shaft allowing the handle and shaft to be rotated together; a fastener threaded to the distal end of the shaft, wherein rotation of the shaft causes the fastener to move axially along the shaft; an accessory mounting bracket positioned at least partially around the shaft between the handle and the fastener; and a compressible grommet positioned around the shaft between the accessory mounting bracket and the fastener; wherein rotation of the shaft causes the fastener to come into contact with the compressible grommet.

An accessory retaining device, comprising: a shaft having a proximal end and a distal end; a handle coupled to the proximal end of the shaft, wherein the handle and the shaft rotate together; a cam bushing positioned around the shaft and in communication with the handle, allowing the handle member to be rotatable between an open and closed position to move the shaft in an axial direction; a grommet located on the shaft at the distal end; and a fastener coupled to the shaft at the distal end, whereby the accessory retaining device is adapted to hold an accessory to a mounting aperture when the accessory retaining device is received within the mounting aperture and the handle is rotated to a closed position.

A vehicle having an accessory attachment apparatus, comprising: a chassis carrying a seat; at least one front wheel and at least one rear wheel coupled to the chassis; a steering member for steering the at least one wheel; an engine carried by the chassis for powering the vehicle; at least one mounting aperture located on the vehicle; an expansion retainer having a proximal and distal end, comprising: a handle; a shaft coupled to the handle at the proximal end, the handle rotatable to move the shaft in an axial direction; a grommet located on the shaft at the distal end; and a fastener coupled to the shaft at the distal end, whereby the expansion retainer is adapted to hold an accessory to the mounting aperture when the expansion retainer is received within the mounting aperture and the handle member is rotated.

The accessory retaining devices of described above and in the claims, wherein the handle and the shaft are configured to rotate together.

The accessory retaining devices described above and in the claims, wherein rotational movement of the handle causes axial movement of the shaft.

An accessory retainer apparatus for a vehicle, comprising: a shaft having a proximal end and a distal end; a handle integrally coupled to the shaft at the proximal end, the handle member rotatable in an open direction or a closed direction to move the shaft in an axial direction; a grommet located on the shaft at the distal end; and a fastener coupled to the shaft at the distal end, whereby the accessory retainer is adapted to retain an accessory to a mounting aperture located on the vehicle when the handle is rotated in the closed direction.

A retention device comprising a threaded shaft having a major axis; a handle integrally connected with the shaft; a threaded fastener configured to be attached to the shaft along the major axis; and a compressible grommet positioned around the fastener between; wherein rotation of the shaft about the major axis causes movement of the fastener along the major axis, causing compression of the compressible grommet.

The retention device described above further comprising an accessory bracket positioned at least partially around the fastener.

The retention device described above, wherein the threaded shaft is threaded internally, and the fastener is threaded externally.

The retention device described above, wherein the threaded shaft is defined by a threaded opening within the handle.

A method of using an accessory retaining device comprising: providing a handle and shaft; placing a cam bushing upon the shaft proximate the handle; placing a grommet upon the shaft; and attaching a fastener to the shaft to retain the grommet and cam bushing about the shaft.

The method described above, further comprising inserting the accessory retaining device into a retaining aperture of a vehicle; and twisting the handle between an open position and a closed position so as to securely affix the accessory retaining device to the vehicle.

The method described above, further comprising installing an accessory mount upon the shaft between the cam bushing and the grommet.

What is claimed is:

1. An accessory retention system for attaching an accessory to an aperture in a device, the accessory retention system comprising:
    a hand-graspable handle having an internally threaded portion;
    an externally threaded shaft having a proximal end and a distal end, the proximal end configured to engage with the handle;
    an accessory positioned at least partially about the shaft, the accessory including a mounting portion, wherein the accessory is selected from the group consisting of a light bar, a rack, a gun rack, a tool holder, a cargo carrier, an auxiliary light, a light, an antenna, a mirror and combinations thereof;
    a flange connected to the distal end of the shaft; and
    a compressible grommet positioned about the shaft between the handle and the flange;
    wherein rotation of the handle upon the shaft causes compression of the compressible grommet such that when positioned in the aperture of the device, the compressible grommet creates a force to help restrict rotation and other movement of the mounting portion of the accessory with respect to the device.

2. The accessory retention system of claim 1, wherein the mounting portion of the accessory includes a forked portion positioned about the shaft to allow for installation and removal of the accessory from the shaft in a radial direction without having to disconnect the handle from the shaft.

3. The accessory retention system of claim 1, wherein the handle is shaped to be grasped by fingers, thumb and palm of a hand to allow for manual tool-less rotation.

4. The accessory retention system of claim 1, wherein the flange is integrally connected to the distal end of the shaft.

5. The accessory retention system of claim 1, further comprising:
    a second handle having an internally threaded portion;
    a second externally threaded shaft having a proximal end and a distal end, the proximal end of the second shaft configured to engage with the second handle;
    a second flange connected to the distal end of the second shaft;
    a second compressible grommet positioned about the second shaft between the second handle and the second flange;
    the accessory positioned at least partially about the second shaft, the accessory including a second mounting portion;
    wherein rotation of the second handle upon the second shaft causes compression of the second compressible grommet and creates a force to help restrict rotation and other movement of the second mounting portion of the accessory with respect to the device.

6. An accessory retention device and accessory, the retention device for attaching the accessory to an aperture in a vehicle, the accessory retention device and accessory comprising:
    a threaded shaft having a major axis;
    a hand-graspable handle integrally connected with the threaded shaft;
    a threaded fastener having a flanged end, the threaded fastener configured to be attached to the threaded shaft along the major axis;
    a compressible grommet shaped to fit in the aperture, the compressible grommet positioned around the threaded shaft between the handle and the flanged end of the threaded fastener; and
    the accessory positioned at least partially about the threaded shaft between the handle and the compressible grommet, wherein the accessory is selected from the group consisting of a light bar, a rack, a gun rack, a tool holder, a cargo carrier, an auxiliary light, a light, an antenna, a mirror and combinations thereof;
    wherein rotation of the threaded shaft about the major axis causes movement of the threaded fastener along the major axis, causing compression of the compressible grommet and further creating a force to hinder rotation and other movement of the accessory with respect to the vehicle.

7. The accessory retention device and accessory of claim 6, wherein the accessory includes an accessory mounting bracket positioned at least partially around the threaded shaft.

8. The accessory retention device and accessory of claim 6, wherein the threaded shaft is threaded internally, and the threaded fastener is threaded externally.

9. The accessory retention device and accessory of claim 6, wherein the threaded shaft is defined by a threaded opening within the handle.

10. An accessory retention device and accessory, the retention device for attaching the accessory to an aperture in a vehicle, the accessory retention device and accessory comprising:
    a threaded shaft having a major axis;
    a hand-graspable handle integrally connected with the threaded shaft;
    a threaded fastener having a flanged end, the threaded fastener configured to be attached to the threaded shaft along the major axis;
    a compressible grommet shaped to fit in the aperture, the compressible grommet positioned around the threaded shaft between the handle and the flanged end of the threaded fastener;
    the accessory positioned at least partially about the threaded shaft between the handle and the compressible grommet; and
    a rigid spacer positioned about the threaded shaft between the compressible grommet and the accessory, the rigid spacer being substantially less compressible than the compressible grommet;
    wherein rotation of the threaded shaft about the major axis causes movement of the threaded fastener along the major axis, causing compression of the compressible grommet and further creating a force to hinder rotation and other movement of the accessory with respect to the vehicle.

11. The accessory retention device and accessory of claim 10, wherein the threaded shaft is defined by a threaded opening within the handle.

12. An accessory retention device and accessory, the retention device for attaching the accessory to an aperture in a vehicle, the accessory retention device and accessory comprising:
- a threaded shaft having a major axis;
- a hand-graspable handle integrally connected with the threaded shaft;
- a threaded fastener having a flanged end, the threaded fastener configured to be attached to the threaded shaft along the major axis;
- a compressible grommet shaped to fit in the aperture, the compressible grommet positioned around the threaded shaft between the handle and the flanged end of the threaded fastener;
- a washer positioned about the threaded shaft between the handle and the compressible grommet; and
- the accessory positioned at least partially about the threaded shaft between the handle and the compressible grommet;
- wherein rotation of the threaded shaft about the major axis causes movement of the threaded fastener along the major axis, causing compression of the compressible grommet and further creating a force to hinder rotation and other movement of the accessory with respect to the vehicle.

13. The accessory retention device and accessory of claim 12, wherein the threaded shaft is threaded internally, and the threaded fastener is threaded externally.

14. The accessory retention device and accessory of claim 12, wherein the threaded shaft is defined by a threaded opening within the handle.

15. An accessory retention system for attaching an accessory to an aperture in a device, the accessory retention system comprising:
- a hand-graspable handle having an internally threaded portion;
- an externally threaded shaft having a proximal end and a distal end, the proximal end configured to engage with the handle;
- an accessory positioned at least partially about the shaft, the accessory including a mounting portion;
- a flange connected to the distal end of the shaft;
- a compressible grommet positioned about the shaft between the handle and the flange; and
- a rigid spacer positioned about the shaft between the compressible grommet and the handle, the rigid spacer being substantially less compressible than the compressible grommet;
- wherein rotation of the handle upon the shaft causes compression of the compressible grommet such that when positioned in the aperture of the device, the compressible grommet creates a force to help restrict rotation and other movement of the mounting portion of the accessory with respect to the device.

16. The accessory retention system of claim 15, wherein the handle is shaped to be grasped by fingers, thumb and palm of a hand to allow for manual tool-less rotation.

17. The accessory retention system of claim 15, wherein the flange is integrally connected to the distal end of the shaft.

18. An accessory retention system for attaching an accessory to an aperture in a device, the accessory retention system comprising:
- a hand-graspable handle having an internally threaded portion;
- an externally threaded shaft having a proximal end and a distal end, the proximal end configured to engage with the handle;
- an accessory positioned at least partially about the shaft, the accessory including a mounting portion;
- a washer positioned about the shaft between the handle and the mounting portion of the accessory;
- a flange connected to the distal end of the shaft; and
- a compressible grommet positioned about the shaft between the handle and the flange;
- wherein rotation of the handle upon the shaft causes compression of the compressible grommet such that when positioned in the aperture of the device, the compressible grommet creates a force to help restrict rotation and other movement of the mounting portion of the accessory with respect to the device.

19. The accessory retention system of claim 18, wherein the mounting portion of the accessory includes a forked portion positioned about the shaft to allow for installation and removal of the accessory from the shaft in a radial direction without having to disconnect the handle from the shaft.

20. The accessory retention system of claim 18, wherein the accessory is configured to be positioned about the shaft such that when the accessory retention system is attached to the device, the mounting portion of the accessory provides support to the accessory through contact with the device.

21. The accessory retention system of claim 20, wherein when the accessory retention system is attached to the device, with respect to the accessory, only the mounting portion of the accessory is in contact with the device.

22. The accessory retention system of claim 18, wherein the handle is shaped to be grasped by fingers, thumb and palm of a hand to allow for manual tool-less rotation.

23. The accessory retention system of claim 18, wherein the flange is integrally connected to the distal end of the shaft.

* * * * *